MASTER CONTROLLER

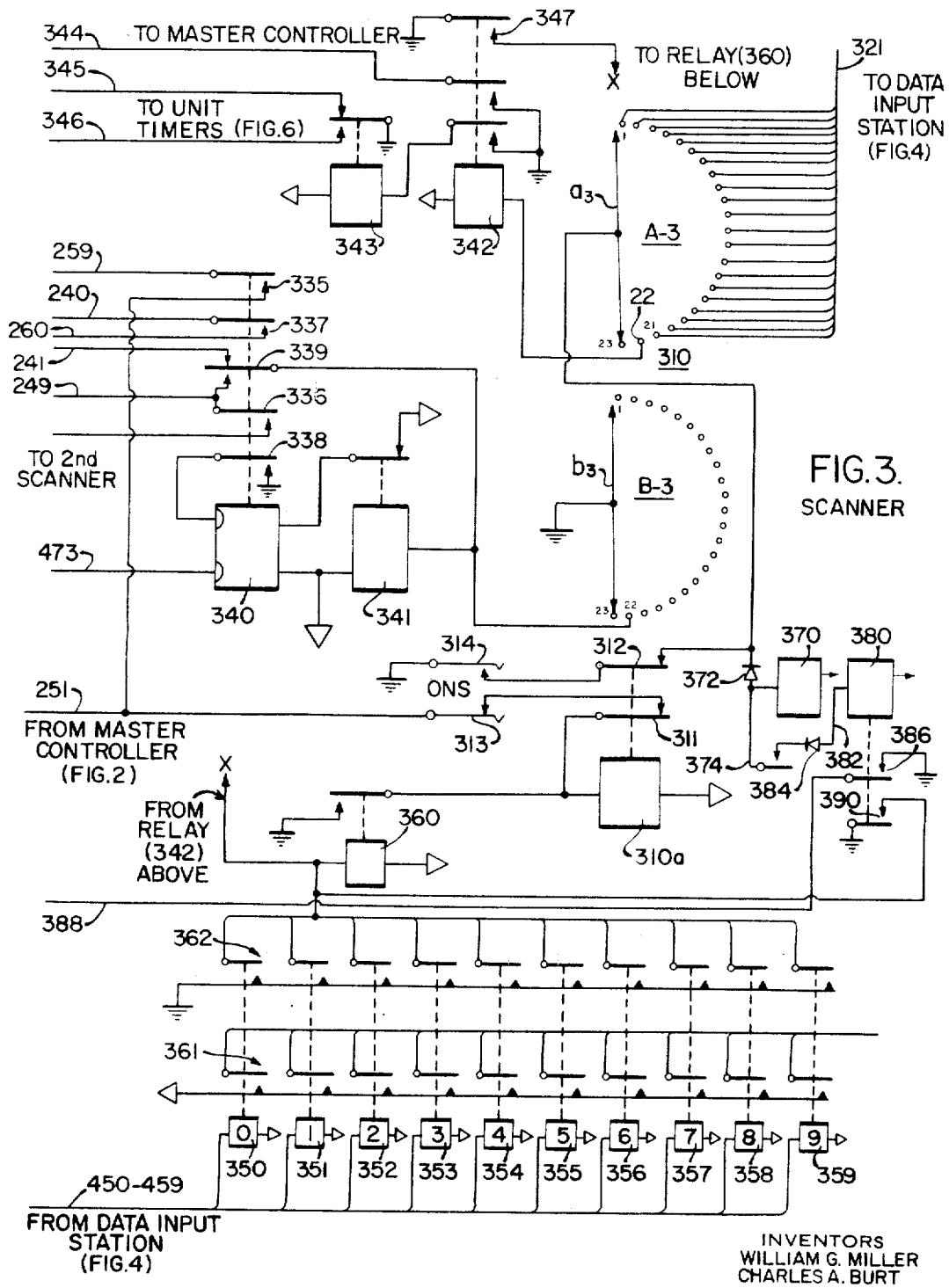

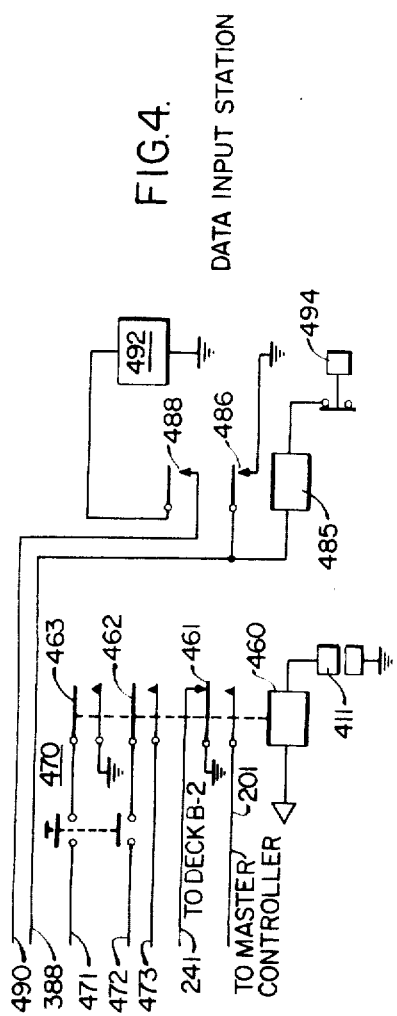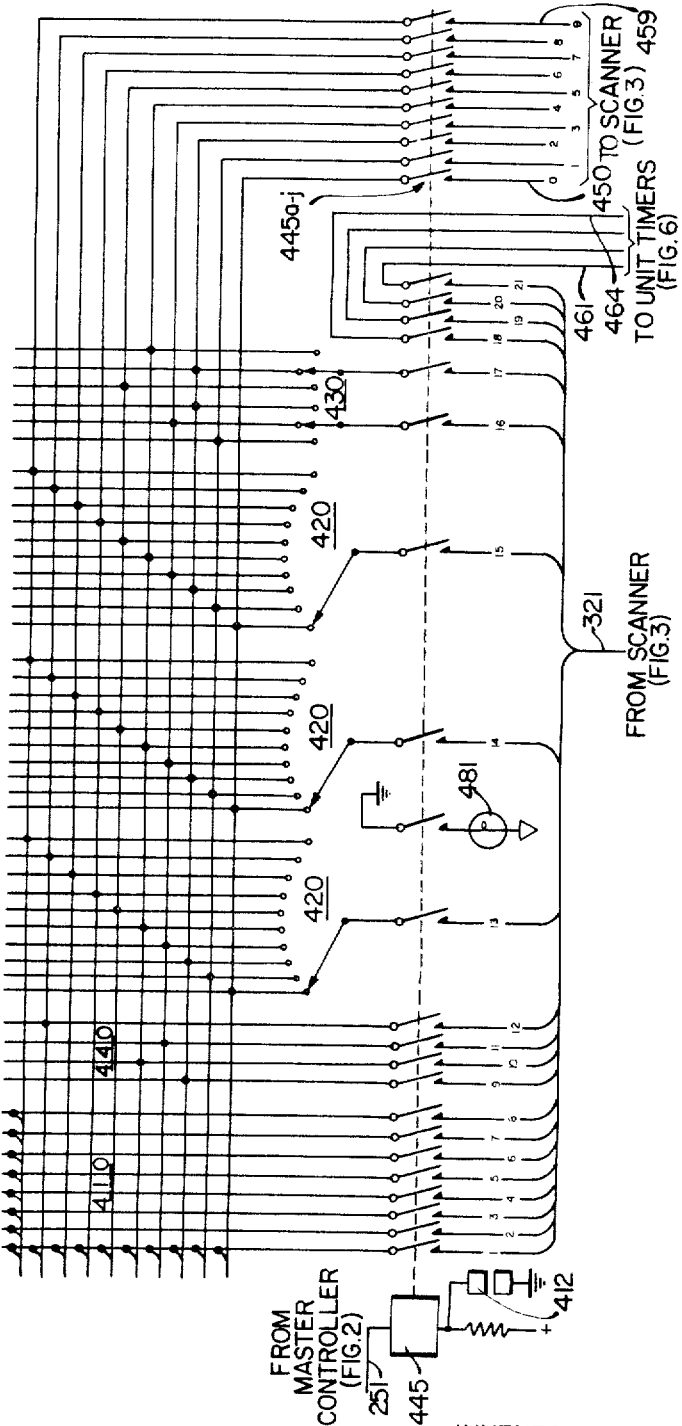

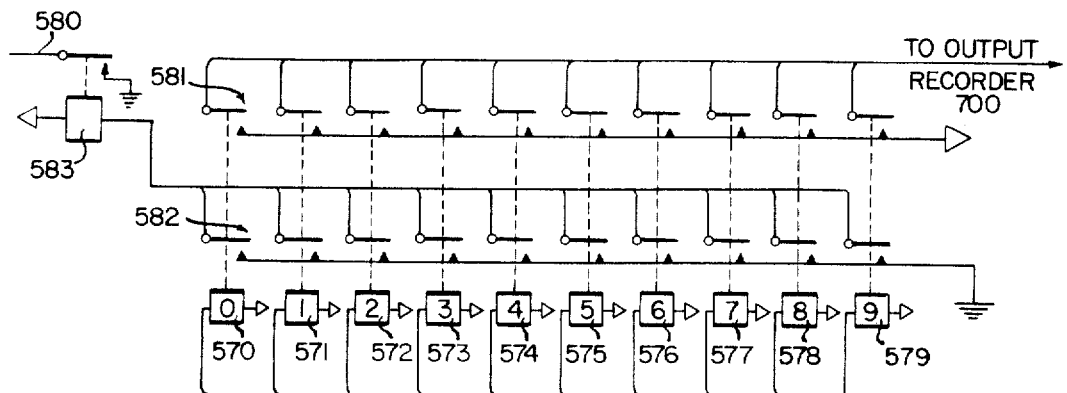
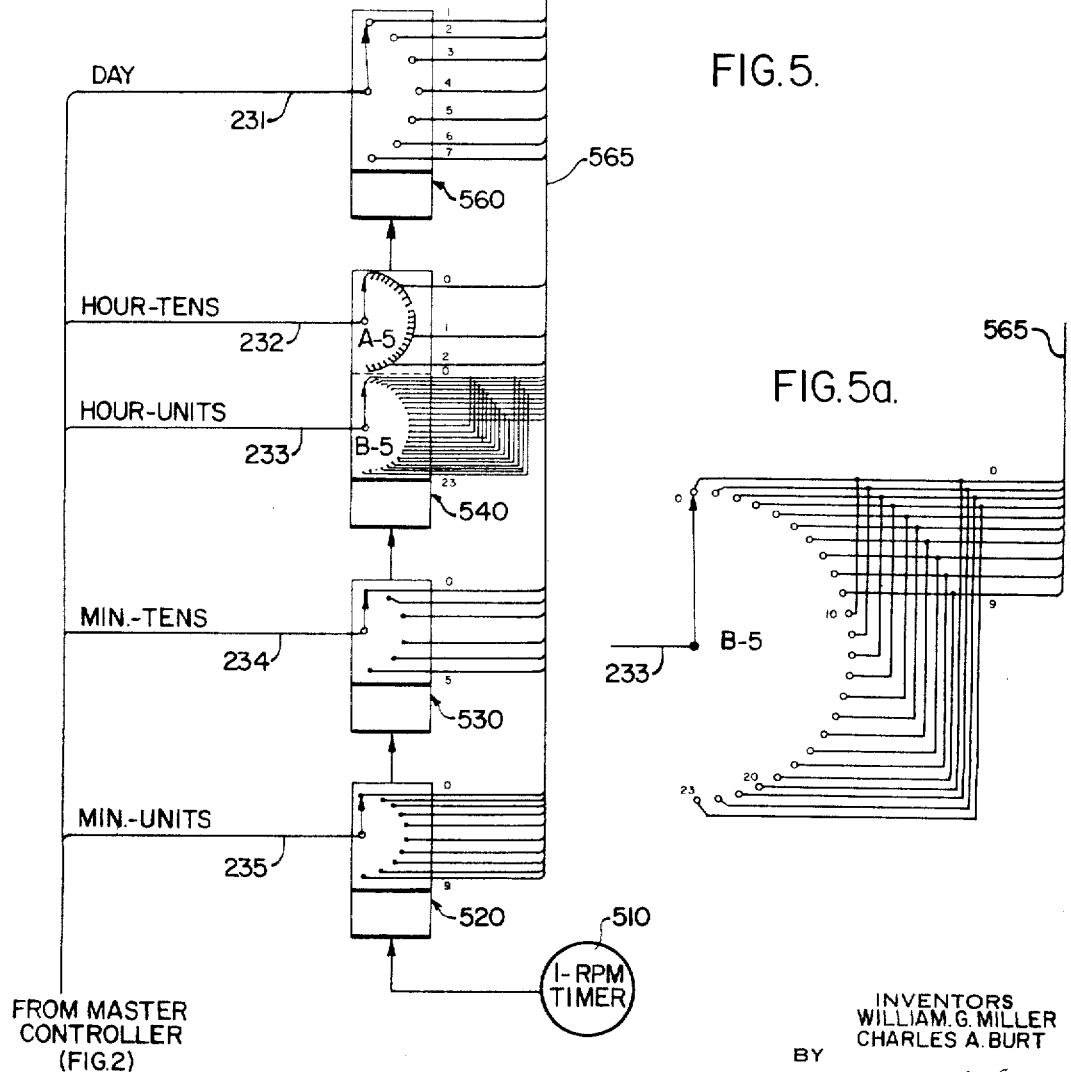
FIG.5.
FIG.5a.

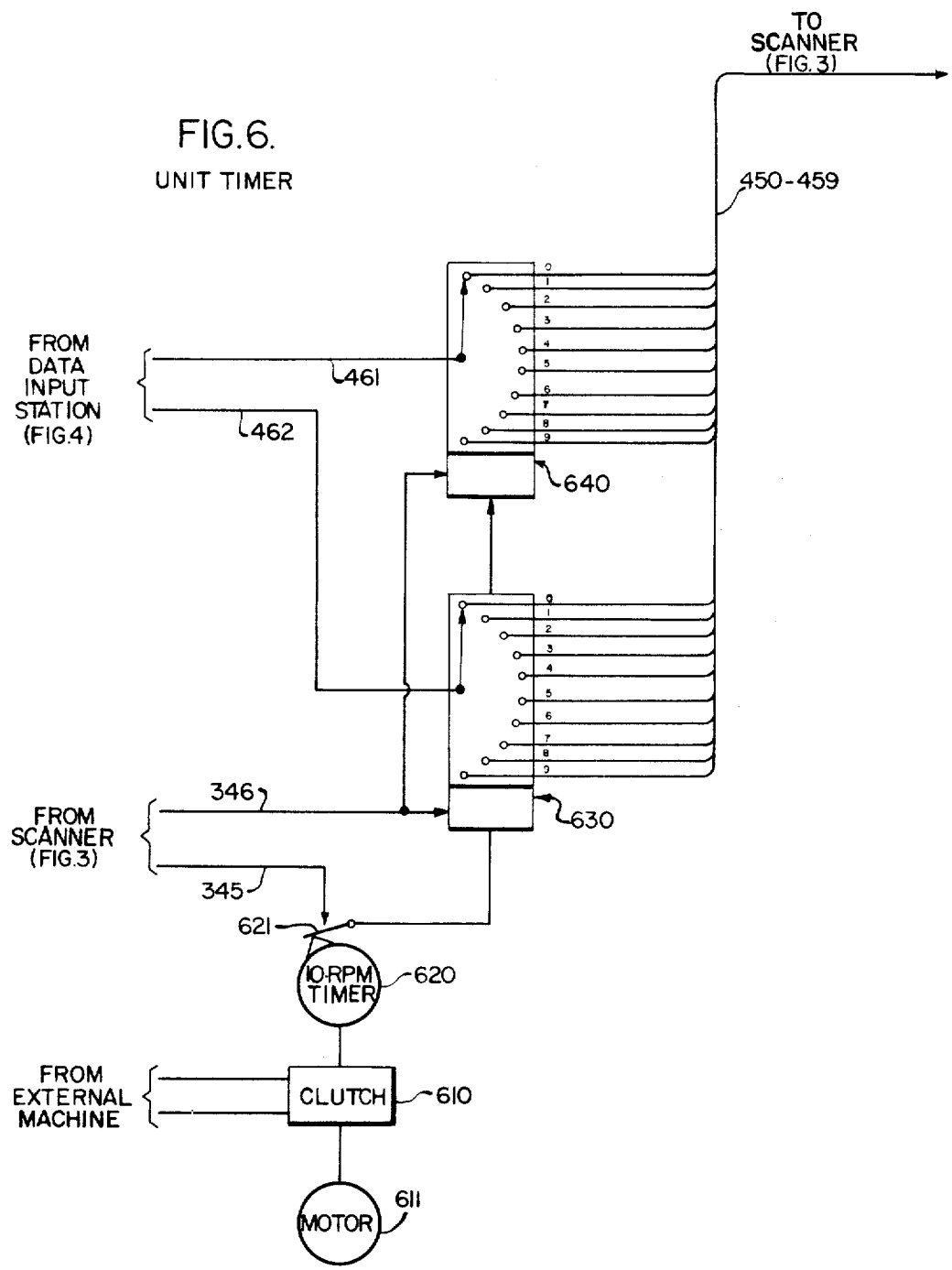

United States Patent Office 3,351,910
Patented Nov. 7, 1967

3,351,910
APPARATUS FOR COLLECTING AND
RECORDING DATA
William G. Miller, West Babylon, and Charles A. Burt,
Oscawana, N.Y., assignors to Communitron, Inc., New
York, N.Y.
Filed Aug. 5, 1964, Ser. No. 387,563
18 Claims. (Cl. 340—172.5)

ABSTRACT OF THE DISCLOSURE

An apparatus and system for collecting and recording data. A master controller is provided and is connected to a plurality of stations which monitor or supply information to the controller. This controller is connected to clock and scanning means for cooperating therewith to select certain information from the stations for recording the same on a recorder.

---

The present invention relates generally to data collection apparatus and is particularly useful for monitoring the use of data processing machines and component units thereof, and recording data with respect thereto.

The use of various data processing machines such as for example, electronic computers, is now widespread. Such machines frequently include a number of component units, of which some may not be required for a particular program or may be used for different periods of time on a program. Some installations may have several machines to satisfy large demands or to cope with different problems. Some installations may be for use by a particular company or government division and others may be for use on a fee basis to organizations which do not need full time use of a machine. In any event, the initial and operating costs of an installation are usually high. Hence it is important that the use of the several machines within an installation, or component units of a machine, be closely monitored for accounting purposes, in order to plan most efficient utilization, for ascertaining the need for expansion, and so forth. The information required to be collected and recorded for such purposes may include items such as machine identification, date and time of recording, job identification, and various other data.

Two alternate procedures may be used in a monitoring operation for an installation. One procedure calls for recording the operating data regularly at predetermined intervals of time as by an automatic scan. The second procedure provides for recording data only when a change in operation takes place, e.g., when a job is ended or a machine is disconnected from the system. This may be accomplished by a manual operation initiated by the user.

If the period of time between automatic scans of an installation is short enough to record all changes in system operation, the accumulation of data by this procedure may be sufficient. If, however, changes occur more frequently than the automatic scans, then the data obtained will not accurately define the utilization of the installation, except perhaps on a statistical basis over a long period of time. A high rate of automatic scan is undesirable because of the great volume of recorded information involved. Yet high-speed data processing machines may perform many different tasks in rapid succession, and such machines may require accurate data on even short-time runs. The manual scan procedure is free of the above difficulty in automatic scanning, but has its own disadvantage in that reliance must be placed on the operator to initiate a manual scan whenever any change occurs, and hence is subject to human error.

The present invention provides for both procedures of data collection, and is capable of collecting data from a plurality of machines each having a plurality of operating component units. Also, the invention provides means for storing information on the period of use of each machine or component unit between successive scans, so that accurate data is obtained without requiring an excessively high scanning rate.

While the features of the present invention will be described in connection with a multi-computer installation, it should be understood that the invention can be used in many other applications where operation is intermittent, such as in certain process control systems and with machines of various types, such as for example, punch presses, screw machines, video tape recorders, and so forth. It will, of course, be appreciated that this invention is also useful in a variety of applications involving data collection per se.

In accordance with one embodiment of the invention, separate stations are provided for each of the plurality of computers to be monitored, each station having one or more recording unit timers that are adapted to accumulate the operation time of each computer or computer unit, and upon interrogation from a central master controller, to supply the accumulated operating times to a central output recorder. Each station may also include an electrical scanner which functions to read out identification (e.g., user, job number, and so forth) stored on a punched card or set of switches, along with the operating times mentioned above. After all the data from a given computer has been scanned and transmitted to the output recorder, the unit timers of that computer are reset by the scanner and the master controller advances to interrogate other computer stations in the system.

Normally, scanning and recording of data take place automatically at a predetermined cycling rate. However, provision is made to allow an operator to initiate a manual scan between the automatically cycled scans. Further, when operating in the automatic scan mode, provision is made so that only those computers in use at the time are scanned. If no computer is in operation, the automatic scan will not proceed. This avoids the accumulation of an excessive amount of unnecessary recorded information.

In the operation of a preferred embodiment of the invention, prior to the commencement of the recording of the operating data from the computers in the installation, the date and time of the scan are also recorded.

All of the objects, features and advantages of this invention and the manner of attaining them will become more apparent and the invention itself will be best understood by reference to the following description of an embodiment of the invention taken in conjunction with the accompanying drawings, in which—

FIG. 3 is a schematic circuit diagram of a Scanner used in FIG. 1;

FIG. 4 is a schematic circuit diagram of a Data Input Station used in FIG. 1;

FIG. 5 is a schematic diagram of the Clock of FIG. 1;

FIG. 5a is an enlarged view of a portion of FIG. 5, and

FIG. 6 is a schematic diagram of a Unit Timer used in FIG. 1.

Figure 1:
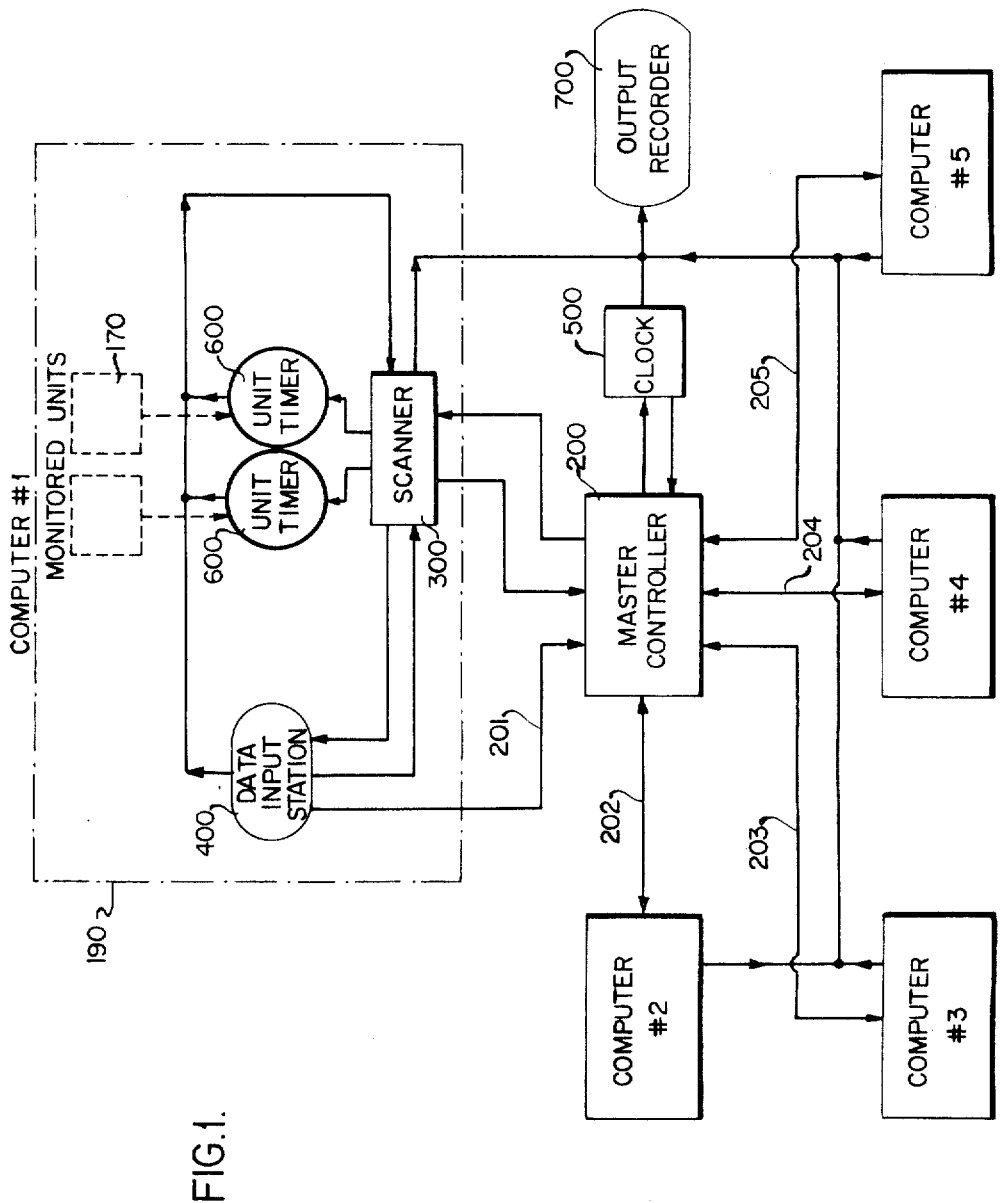
FIG. 1 is an overall block diagram of a computer installation monitoring system.

Referring to FIG. 1, the operation of the system will first be described generally. The system shown is capable of monitoring and recording operating data from five computers. As will be apparent from the following description, the number of computers or other data processing machines monitored may be varied to suit the requirements of a particular application. One monitor station is shown in greater detail than the others.

Overall control of the system is exercised by a centrally located Master Controller 200. At the beginning of each scan, whether automatic or manual, the Master Controller causes a centrally located Clock 500 to read out the day of the week and time of day information to a centrally located Output Recorder 700. The recorder 700 may be a conventional card punch, printer, or any convenient record-making machine.

The monitoring apparatus located at each station in the installation includes a Data Input Station 400, a scanner 300 and a Unit Timer 600 for each machine or component unit to be monitored at that station. Only two Unit Timers are shown, but the number may be increased as desired. Also, a single, centrally located Scanner for the entire installation may alternately be employed, as will appear.

In an automatic scan, after the Clock has read out the day and time data to the Recorder, the Master Controller sends a signal to the Scanner associated with the first computer station in use at that time. The Scanner then begins to scan through the data held by the Data Input Station and the Unit Timers. Each Data Input Station has a card reader into which is inserted a punched card containing a job number and/or other identification data whenever a machine is put into operation. The presence of such a card in the card reader of a Data Input Station indicates that the associated equipment is in operation. Other identification data may be registered by setting switches located in the Data Input Station. All this data is transmitted to the Output Recorder via the Scanner. When the identification and operating time data have been recorded, the Scanner clears out the accumulated times from the Unit Timers and signals the Master Controller to go on to interrogate the next station in operation. This process is repeated until the information from all operating stations is recorded.

In a manual scan, the computer operator initiates the scanning and recording of the identification and operating time data of his station. This is done by depressing a pushbutton located on the Data Input Station associated with this computer. The manual scan demand signal is transmitted via the Scanner to the Master Controller which causes the Clock to read out the day and time data and then causes the Scanner to operate and read out only the data from the station demanding the manual scan. All the other stations are ignored in such a scan.

The particular embodiment of the invention shown and described herein makes use of electromagnetic switching circuitry. One terminal of each relay coil is returned to a power supply voltage symbolized in the drawings by a closed arrowhead, as, for example, 280 in FIG. 2. When ground potential is applied to the other terminal of a relay coil, the coil will be energized, and the contacts associated with the relay will switch. The relay contacts are shown in the drawings in their deenergized positions.

The embodiment also makes use of rotary stepping switches. The coil of one 25-position stepping switch 210 is shown at 210a in FIG. 2. Each cycle of energization and deenergization of coil 210a causes the four wiper arms $a_2$, $b_2$, $c_2$ and $d_2$ of the decks of contacts A–2, B–2, C–2 and D–2 of the stepping switch 210 to move one position clockwise. When coil 210a is energized, the interrupter contacts 211 and 212 of the stepping switch 210 are opened. When coil 210a is deenergized, the interrupter contacts 211 and 212 return to their normal closed position shown in FIG. 2. and the wiper arms move to the next position. When the wiper arms are on the last contact (25th position), the stepping switch 210 is said to be in its normal or "home" position. In the normal position, the off-normal-switches (ONS) of the stepping switch 210 are in the state illustrated by 213 and 214 in FIG. 2.

When coil 210a is ten energized and deenergized the wiper arms move off the 25th position and onto the first position, and the ONS contacts switch to the state opposite that shown. The ONS contacts maintain the latter state until the wiper arms again rest on the 25th position, whereupon the ONS contacts take the positions shown.

In the following description headings are used to designate a particular unit or function being described, it being understood that the descriptions are not entirely exclusive.

*Master controller*

A detailed description of the operation of the system will now be given, beginning with the operation of the Master Controller 200 shown in FIG. 2. Lines 201–205 come from the Data Input Stations 400 associated with Computers 1–5, respectively. As will be apparent from later description, if a Data Input Station has a card in its card reader (indicating that the corresponding computer is in use) ground potential is applied to that one of the five leads 201—205 which is connected to the particular Data Input Station. These leads are connected to each other and to terminal 206 of Timer 207. Timer 207 is powered by a ⅙ r.p.m. motor which closes its switch contacts once every six minutes. The speed of this motor defines the frequency of automatic scans of the computers. If any one of the computers is in use, terminal 206 is at ground potential. Then when the timer contacts close, ground is applied to the coil of relay 208, energizing it and beginning the automatic scan procedure. If none of the computers is in use, terminal 206 is not at ground and when the contacts of timer 207 close, relay 208 is not energized and no automatic scan is effected.

Assuming that at least one computer is in use, when relay 208 is energized ground is extended from its contact 209 through the normally closed contact 215 of relay 223, and through the ONS contact 214 to energize the coil 210a of the 25-position stepping switch 210. Accordingly, the stepping switch 210 moves from its normal position to position 1. The first five positions of the wiper $a_2$ of deck A–2 of this stepping switch are used to read out the time information held in the Clock 500. When wiper $a_2$ is on the first position, ground is extended from the interrupter contact 212 through the wiper arm to lead 231. Leads 231–235 are connected to the first five terminals of the deck A–2 and go to the Clock unit.

*Clock*

At this point the description of the Master Controller Unit 200 will be interrupted to describe the Clock unit 500, so that the operation of the control unit will be clear.

Referring to FIG. 5, the Clock unit stores the day of the week, hour and minute information on a real-time basis by means of four rotary stepping switches 520, 530, 540, and 560. A one r.p.m. recycling timer 510 is connected to generate one ground pulse per minute. Each pulse causes the stepping switch 520, which has 10 positions, to advance one position. The first position is designated "0" to indicate zero minutes, and the tenth position is designated "9" to indicate nine minutes. Similar nomenclature is used on stepping switches 530 and 540.

The stepping switch 520 is so arranged that when it steps from its tenth position back to its first position it generates a pulse which causes the 6-position stepping switch 530 to advance one step. When the stepping switch 530 steps from its sixth position back to its first position it generates a pulse which advances the 24-position stepping switch 540 one step. This stepping switch 540 has two decks of contacts A–5 and B–5, to facilitate recording of the hour of the day in digits 00 to 23. Stepping switch 540 generates a pulse to actuate a 7-position stepping switch 560 whenever 540 moves from its 24th position to its first.

It is apparent from this arrangement that stepping switches 560, 540, 530 and 520 are capable of indicating (by position of their wiper arms) the day of the week, the hour of the day, tens of minutes and units of minutes, respectively.

The contacts of the several stepping switches 520, 530, 540 and 560 are connected by a multiple-conductor cable 565 to digit relays 570–579. Thus by connecting the wiper arms of these stepping switches to ground, as will appear, the digit relays 570–579 may be actuated.

The ten contacts 0–9 of the stepping switch 520 are connected to corresponding digit relays 0–9, indicated by the numerals 570–579. The six contacts 0–5 of the stepping switch 530 are connected to digit relays 570–575. The grouped contacts of deck A–5 of stepping switch 540 are connected so that group "0" goes to digit relay 570, group "1" to digit relay 571 and group "2" to digit relay 572, thus reading out the tens hours. Referring particularly to FIG. 5a, the first decade of contacts on deck B–5 of the stepping switch 540 are connected to corresponding digit relays 570–579. The second decade of contacts of deck B–5 are connected to the first decade thereof, respectively, and the last four contacts are connected to the first four contacts, respectively. The wiper arms of decks A–5 and B–5 are energized successively, as will be described, so as to read out tens-of-hours first and then unit hours. The seven contacts of stepping switch 560 are connected to corresponding digit relays 571–577.

Each digit relay 570–579 has two sets of contacts. One set 581 energizes a lead connected to the Output Recorder 700 and causes the digit corresponding to whichever digit relay is energized to be recorded. The second set of contacts 582 energizes slow-operating relay 583, thereby placing a ground signal on line 580 whenever any digit relay is operated, for a purpose to be described later.

*Master Controller (continued)*

Figure 2:
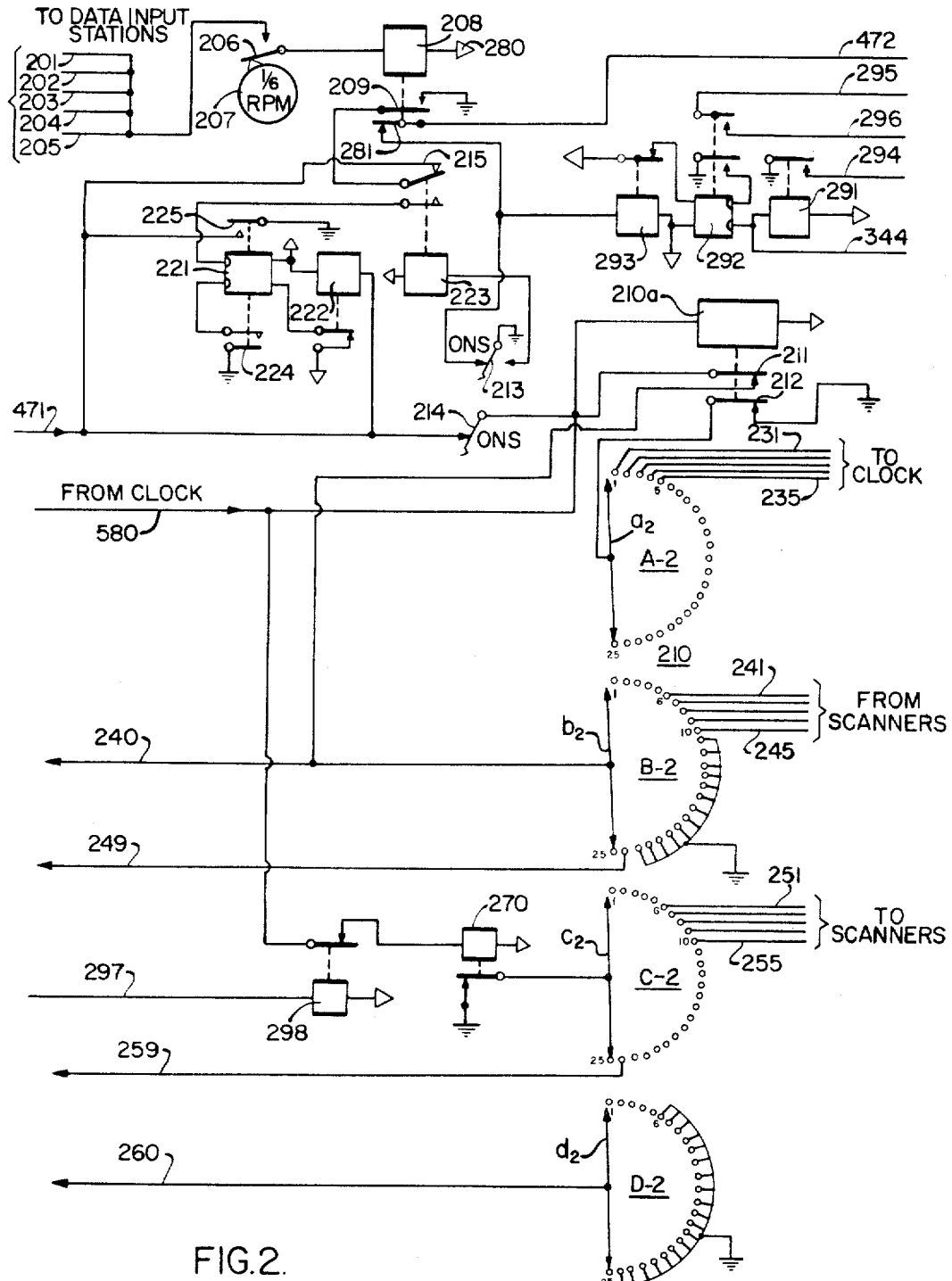
FIG. 2 is a schematic circuit diagram of the Master Controller of FIG. 1.

Referring now to the Master Controller of FIG. 2, in conjunction with FIG. 5, it will be seen that leads 231–235 of the stepping switch deck A–2 in FIG. 2, are connected to the wiper arms of the time stepping switches of FIG. 5. When ground is applied to lead 231, it is extended via the wiper arm of day-of-the-week stepping switch 560 to one of its seven terminals, and causes one of the digit relays 571–577 to be energized to record the day. The actuation of one of the digit relays will energize relay 583 and extend ground to lead 580 which is returned to the Master Controller Unit. Lead 580 is connected to the stepping switch coil 210a. When it is at ground it energizes the stepping switch 210 and causes the interrupter contacts 212 to open, thereby removing ground from lead 231. The energized digit relay and relay 583 in the Clock are then deenergized, ground is removed from lead 580 and stepping switch 210 becames deenergized, causing its wiper arms to move to the next (second) position. Ground is now applied to lead 232 and the process is repeated, but this time the Clock will effect the recording of the tens-digit information of the hour, e.g., a zero if the time is 0800, a 1 if the time is 1000 and a 2 if the time is 2000. In this manner the stepping switch 210 will step through the first five positions and the day of the week, hour (tens), hour (units), minute (tens) and minutes (units) will be recorded. It should be noted that merely by extending the number of positions allotted on deck A–2 of stepping switch 210 to this process, increasing the corresponding number of leads to the Clock, and adding appropriate circuits in the Clock, additional time or identification information (code numbers, etc.) may be recorded at this stage of the scan.

When the last piece of information has been read out of the Clock, the wiper arms of stepping switch 210 move to position 6. Deck A–2 of the stepping switch 210 is now out of the circuit and Decks B–2, C–2 and D–2 are utilized. Deck B–2 is used to sense which of the computer stations in the system are in use, and lines 241–245 are connected to its sixth to tenth position terminals, respectively. These lines come from the five Data Input Stations 400 in the five computer stations of the system.

As will be further described later, if a particular computer is not in use, the corresponding line 241–245 is placed at ground potential. Thus if the first computer installation is not in use, lead 241 will be grounded and when wiper arm $b_2$ moves to the sixth position, ground will be extended through the arm and through the interrupter contacts 211 to the stepping switch coil 210a, which then steps to the next (seventh) position. If the second computer is not in use the stepping switch 210 will move to the next position, and so forth, until it finds a position where the corresponding computer is in use. It will be seen, therefore, that the stepping switch 210 functions as a station selector switch.

Now assuming that computer No. 1 is in use, the lead 241 will not be at ground potential, and when the wiper arm $b_2$ of the stepping switch 210 moves to the sixth position it will stop there and Deck C–2 will come into play. The coil of slow-release relay 270 is energized through the normally closed contacts of relay 298 by the same pulses from interrupter contacts 211 which cause the stepping switch 210 to step. When the wiper arm $b_2$ finds an ungrounded position the series of quick stepping pulses stops, allowing slow-release relay 270 to release and apply ground through its contacts to wiper arm $c_2$. With wiper arm $c_2$ in the sixth position, the ground signal is applied to lead 251 which is connected to the scanner 300 associated with computer station No. 1. As described later, the ground signal initiates the scanning process at the computer station and causes the information stored in the Data Input Station and Unit Timers associated therewith to be read-out to the Output Recorder. When the Scanner 300 has completed this process it applies a ground pulse to lead 241 and this signal, as described above, causes the stepping switch 210 to move on to sense for the next computer use.

The stepping switch 210 steps through its sixth to tenth positions, scanning in turn each computer in use. Positions 11 through 23 of Deck B–2 are connected to ground, and when wiper arm $b_2$ moves to the eleventh position after the read-out of the last computer, the stepping switch 210 steps rapidly to position 24. Terminal 24 of Deck B–2 is connected to lead 249 which passes through each of the Scanners 300 in the system in such a manner that it will be at ground potential if no manual scan is in process, or upon completion of a manual scan. When wiper arm $b_2$ finds ground on line 249, the stepping switch 210 steps "home" and the automatic scan is completed.

Deck D–2 and relays 221–223 will be described later in connection with Manual Scan, and relays 291–293 in connection with Recorder Control.

*Scanner*

Refering now to FIG. 3, the operation of the Scanner unit 300 in computer No. 1 will be described in detail. The transmission of a ground pulse on lead 251 from the Master Controller begins the scanning process. The ground on lead 251 is transmitted through the ONS contacts 313 and interrupter contacts 311 to the coil 310a of a two-deck, 23-position stepping switch 310. As a result, the stepping switch 310 is energized, interrupter contacts 311 open, switch 310 deenergizes, and the wiper arm $a_3$ and $b_3$ on decks A–3 and B–3, respectively, move to the first position. Ground is extended from the ONS contacts 314 (now in the closed position), through the closed interrupter contacts 312 to the wiper arm $a_3$. The ground signal is distributed by the wiper arm $a_3$ to the first of 21 leads in cable 321 connected to the Deck A–3 terminals. These 21 leads run to the Data Input Station (FIG. 4) associated with the Scanner and form the input leads to an information storage matrix. There are ten output leads 450–459 from the matrix and when any one of the first seventeen input leads in cable 321 is set to ground, one of the ten output leads 450–459 is grounded, the particular output lead depending upon the information stored in the matrix. The output leads 450–459 are returned to the Scanner and each lead controls one of ten digit relays 350–359.

The digit relays 350–359 are very similar to the digit relays 570–579 located in the Clock unit (FIG. 5), already described. Each digit relay 350–359 has two sets of contacts. One set 361 is used to energize a corresponding relay in the Output Recorder 700, and thereby cause a digit of information to be recorded whenever the wiper $a_3$ of the stepping switch 310 actuates one of the digit relays 350–359. A second set 362 is used to energize slow-operating relay 360 which in turn energizes the stepping switch coil 310a whenever a digit relay in the group 350–359 is energized. When the stepping switch 310 is energized in this manner, interrupter contacts 312 open, removing ground from wiper arm $a_3$ and also from the Data Input Station matrix. The energized digit relay is thus deenergized, removing ground from relay 360, and causing the stepping switch coil 310a to deenergize to move the stepping switch 310 on to the next position. In this manner the Scanner cycles through its first seventeen positions reading out the seventeen digits of information held by the Data Input Station information matrix.

The last four of the twenty-one leads from Deck A–3 are also connected to the Data Input Station (FIG. 4) but from there proceed via wires 461–464 to the Unit Timers associated with the Scanner. These are described separately later, and it is enough to state here that the application of ground to one of these four lines also results in the presence of a ground signal on one of the matrix output lines 450–459, and the energization of a corresponding digit relay 350–359.

The stepping switch 310 therefore steps through twenty-one positions and comes to rest on position 22. In this position wiper arm $a_3$ extends ground to the coil of relay 342, energizing it. When relay 342 is energized it energizes slow release relay 343 and also supplies ground to lead 344. The grounding of lead 344 serves as a signal that the scanning at the respective station has been completed, and may be supplied to the Recorder for control purposes. In this specific embodiment, however, it goes back to the Master Controller as will be described later under the heading "Recorder Control." Slow release relay 343, upon operation, removes ground from lead 345 and applies ground to lead 346. Both these leads are connected to the Unit Timers (FIG. 6) associated with the Scanner. Ground on 345 enables the timers to run, whereas ground on 346 "clears" the timers of their accumulated time.

When the stepping switch 310 is in its 22nd position, wiper arm $b_3$ thereof connects ground to line 241 through the switch 339 of relay 340, which is not energized at this time. As has already been described, a ground signal on line 241, connected to Deck B–2 of the Master Controller stepping switch 210, causes this switch to move on to the Scanner in the next computer station of the system. The energization of relay 342 at this time also closes switch 347 and energizes slow operating relay 360, thereby supplying ground to stepping switch 310 to step it to its last or "home" position where it awaits the next ground signal on lead 251 to begin its scanning and read-out procedure again.

This completes the description of the Scanner operation in an automatic scan. Portions involved in a manual scan will be described later.

Data input station

A Data Input Station, shown in FIG. 4, makes use of an information storage matrix. Information may be stored by means of a punched card and card reader 410, permanently wired connections 440, rotary decade switches 420, multi-position lever switches 430 or by other suitable connection means. The embodiment shown in the figure has an eight-column card-reader 410 for variable data such as job number, four digits of permanently wired storage 440 for fixed data such as computer identification, and three digits stored by decade switches 420 together with two digits stored by lever switches 430 selectable by the user. The matrix therefore has seventeen input lines in cable 321 and ten output lines 450–459, the latter representing the digits 0–9. When any one input line is grounded, one and only one output line is grounded, either by means of a card-reader pin making a connection in matrix portion 410 through a hole in a punched card, or by a soldered connection in portion 440, or by a switched connection in the remainder of the matrix. The number of input lines and the connection thereof to the digit lines may be varied widely as desired.

When a computer is to be used, a card is placed in the card reader of the corresponding Data Input Station 400. Index pin 412 in the card reader is positioned over an area of the card normally unpunched. If there is no card in the reader, pin 412 will contact ground and prevent relay 445 from operating. If a card is properly placed in the card register, pin 412 will not contact ground and relay 445 will be energized upon application of a ground signal to lead 251, which is the command from Deck C–2 of the Master Controller stepping switch 210 (FIG. 2) to begin read-out of information from this computer station. When relay 445 closes, it connects the lines 321 (read-outs leads) from the Scanner (FIG. 3) to the input of the matrix, and it also connects the ten matrix output lines (digit leads) to the digit relay inputs 450–459 in the Scanner.

A second index pin 411 in the card reader is positioned over an area of the card which is normally punched. Thus when a card is properly placed in the reader, pin 411 contacts ground and energizes relay 460. Through its contacts 461, relay 460 then places ground on lead 201. This lead 201, along with the corresponding leads from the other Data Input Stations in the system, is connected to the timer circuit in the Master Controller (FIG. 2), and ground on 201 or any of the other leads enables the start of an automatic scan.

If a card is not in the reader, the computer is not operating (or at least operation cannot be identified), and it is desired to eliminate unnecessary scanning at the station. The card reader is conventionally arranged so that when it is open, the reading pins do not contact ground. Specifically, pin 411 will not contact ground. Further, if a card is not properly positioned in the reader, identification and other information will be in error, and station scanning will be eliminated. Under this condition also, pin 411 will not contact ground. Therefore, in both cases relay 460 is not energized and ground is on lead 241 which is connected to Deck B–2 of stepping switch 210 in the Master Controller Unit, thereby stepping this switch on to select the next computer. The remaining contacts on relay 460 will be described in conjunction with the operation of a manual scan.

Unit Timer

A Unit Timer is shown in FIG. 6. A circuit of the unit to be monitored, capable of serving as an indication that the unit is operating, is connected to energize the clutch 610 of a 10 r.p.m. re-cycling timer 620 driven by a motor 611. Lead 345 comes from the Scanner (FIG. 3) and is normally at ground potential, so that a ground pulse is transmitted through the timer contacts 621 to the coil of a ten-position stepping switch 630 after each six seconds of operation of the unit or machine being monitored. Each of these pulses advances the stepping switch 630 one position. The stepping of the switch 630 from its tenth position causes a second 10-position stepping switch 640 to advance one step. Both stepping switches 630 and 640 are returned to their "home" or "zero" position when they reach the limit of their count, or upon receiving a ground signal on line 346 from the Scanner. In this manner the stepping switches 630 and 640 register the tenths of minutes, and minutes, respectively, of the monitored unit's operating time. Lines 461 and 462 come from the Data Input Station (FIG. 4) and are connected to the wiper arms of the stepping switches 640 and 630, respectively. As a result of the Scanner's operation, these lines 461 and 462 are pulsed in sequence and the ground pulse is transmitted via the wiper arm of each stepping switch to one of the ten output leads 450–459 connected to the digit relays 350–359 located in the Scanner. The stored operating time information held by the stepping switches 630 and 640 is thereby transmitted to the Output Recorder 700.

*Manual scan*

A manual scan may be initiated by an operator at any computer station of the system. In a manual scan only the information stored in the Data Input Station and Unit Timers at the station demanding the scan is recorded, along with the Clock information. All other computers in the system are ignored. To initiate such a scan the operator depresses push-button switch 470 located in the Data Input Station (FIG. 4) of his computer. As already described, if the computer is in operation with a card properly placed in the card reader of the Data Input Station, relay 460 will be energized. Depressing button 470 connects ground through relay contacts 463 to lead 471, and connects lead 472 through relay contacts 462 to lead 473.

Lead 471 is connected to the stepping switch coil 210a in the Master Controller (FIG. 2) through the ONS contact 214. Assuming that the stepping switch 210 is in its "home" position at this time, the presence of ground on lead 471 and its removal when the push-button 470 is released, causes the stepping switch 210 to move to its first position and to begin the process of reading out the information from the Clock Unit.

With the stepping switch 210 in its "home" position when push-button 470 is depressed, the ONS contact 213 of this switch will connect ground through the contacts 281 of relay 208 to lead 472, which is connected to lead 473 by push-button 470. Lead 473, in turn, goes to the Scanner (FIG. 3) associated with the Data Input Station, demanding a manual scan.

Referring further to FIG. 3, the ground on lead 473 energizes relay 340 which latches itself in an energized state through its contacts 338 and the contacts of relay 341. The energization of relay 340 effects certain circuit changes which cause the Master Controller to ignore all the other Scanners in the system and to interrogate only the Scanner demanding read-out. One circuit change is the connection of leads 240 and 260 together through contacts 337 of relay 340.

Referring now to the Master Controller in FIG. 2, it will be seen that after the stepping switch 210 has read out the information from the Clock Unit through Deck A–2, and has moved to its sixth position, the wipers of Deck B–2 and Deck D–2 are tied together through the 240, 260 connection, supra. Terminals 6–24 of Deck D–2 are grounded and wiper arm $d_2$ transmits this ground through leads 260, 240 to the coil 210a of the stepping switch 210, which is thereby caused to step to its 24th position, omitting its normal read-out procedure.

Two other circuit changes caused by actuation of relay 340 in the Scanner (FIG. 3) are now brought into play. Lead 259 is connected to lead 251 through switch 335, and lead 249 is connected through switch 339 to the 22nd terminal of Deck B–3 of stepping switch 310. When the stepping switch 210 in the Master Controller stops on its 24th position, ground is connected through the contacts of slow release relay 270 and wiper arm $c_2$ to lead 259, and thence to lead 251 in the Scanner to initiate the reading out of the Data Input Station and Unit Timer information as described above. When the Scanner has completed its activity, wiper arm $b_3$ of the stepping switch 310 rests in its 22nd position and sends a ground signal through switch 339 and lead 249 back to the Master Controller, which via wiper arm $b_2$ of stepping switch 210 steps this switch to its "home" (25th) position. The same ground signal to switch 339 also energizes relay 341, thereby unlatching relay 340, and the entire system is restored to its normal state. Through this process the operator of a computer has effected the recording of the Clock information and the data from his own Data Input Station and Unit Timers, but no other computer's information has been recorded.

Several relays in the Master Controller (FIG. 2) are provided to ensure that if an automatic scan signal occurs while a manual scan is in process, this fact will be remembered and an automatic scan initiated following the completion of the manual scan. Whenever a scan, automatic or manual, is under way, the stepping switch 210 will be off its "home" position and its ONS contacts 213 will energize relay 223. If an automatic scan signal actuates relay 208 when relay 223 is energized, the ground pulse will not go through switch 215 and eventually to stepping switch 210 as in normal operation, but it will be diverted by switch 215 in its lower position to energize relay 221. Relay 221 latches itself through its contacts 224 and the contacts of relay 222. When stepping switch 210 returns "home" at the end of its scan, ground will be supplied by contacts 225 of relay 221 through ONS contacts 214 to begin an automatic scan. This same pulse also energizes relay 222 which then unlatches relay 221.

If a manual scan signal from line 471 occurs during an automatic scan, it will not pass through the then open ONS contacts 214 to stepping switch 210, and will therefore be ignored.

It is desirable to inform the operator that a read-out of information at his computer has occurred, and that he is free to remove the identification card from the card-reader and insert a new one. This is accomplished by arranging lamp 481 (FIG. 4) to be lighted by relay 445, this relay being energized whenever a scan is taking place at that particular computer. By pressing push-button 470, and waiting for lamp 481 to go on and then off, the operator knows that the information at that particular computer has been read-out, whether in response to the push-button or by an automatic scan in progress. If by chance an operator at another computer has also called for a manual scan, the failure of lamp 481 to light for the short time required for a scan (which may be short compared to the interval between scans), will inform the operator that he should push button 470 again.

*Error detection*

The system also includes error detection means for sensing various errors and for actuating an alarm to indicate to the operator that the system is malfunctioning in some manner. Among the errors detectable are those resulting from a reading pin in the card reader being dirty, or an item of information being missing on the card in the card reader, or in the Unit Timer, or in the Clock. Generally, any missing information that is supposed to be read by the Scanner will be detected by an error detection circuit. Referring now to FIG. 3, when any such error is present, the apropriate digit relay of the relay group 350–359 will not become energized, causing the stepping switch 310 to stop and also causing the interrupter contacts 312 to remain closed. Since the ONS contacts 314 are also closed at this time, the slow operating error relay 370 will be connected to ground through these contacts and the diode 372. Operation of this relay closes the contacts 374, thereby also actuating another relay 380 by grounding the lead 382 thereof through a diode 384. This causes the contacts 386 to close, grounding the lead 388 which is connected to an alarm circuit in the Data Input Station to sound an alarm, as will appear. Actuation of the relay 380 also closes the contacts 390, which energizes the relay 360 which in turn energizes the stepping switch 310, thereby resuming operation of the wipers $a_3$ and $b_3$. Advancement of these wipers is only resumed, however, after sufficient time has elasped for the slow operating error relay 370 to operate and cause actuation of the error alarm, now to be described.

Referring now to FIG. 4, when the lead 388 becomes grounded as just explained, an alarm relay 485 is thereby actuated, closing a set of holding contacts 486 and another set of contacts 488. The contacts 488 connect a potential line 490 to an alarm 492, which may be a bell, buzzer, light, or other suitable indicator for alerting the operator to the presence of an error in the system. The alarm is reset by depressing a spring-held contactor 494, thereby removing power from the alarm relay 485 so that the holding contacts 486 may open.

In the foregoing description, only one embodiment of the invention has been described, however, it will be appreciated that numerous modifications thereof are possible within the scope of the invention. Thus, for example, the system can be modified to include the functions of the Scanner 300 with the Master Controller 200, in a manner which requires only one scanner regardless of the number of computers to be monitored.

In such an arrangement, various changes in the stepping switches 210 and 310 in the Master Controller 200 and the Scanner 300, respectively, are required, along with circuit changes in these units, as will be apparent to those skilled in the art. The stepping switch 310 would be modified to further include the clock information deck A-2 of the stepping switch 210. The modified stepping switch 210 would include the decks B-2 and C-2 shown in FIG. 2, however, the deck D-2 would no longer be required; additionally ten new decks would be employed to replace the contacts 445a–j on the relay 445, see FIG. 4, which switch the leads 450–459. If desired, the remaining 21 contacts on the relay 445 can then be eliminated by employing conventional isolating diodes in lieu thereof, and the relay 445 can then be eliminated.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A system for monitoring the operation of a plurality of data processing units at a plurality of stations which comprises
    monitoring apparatus associated with said stations including a data input station having means for registering information to be reported, and a unit timer for each unit to be monitored having means for registering the accumulated operation time thereof,
    a scanner for selecting sequentially the information registered in the data input stations and the operating times registered by the unit timers,
    recording means for recording the information sequentially selected by said scanner,
    clock means for registering time,
    and a controller for supplying time registered by said clock to said recording means and actuating said scanner to record the information sequentially selected thereby.

2. Apparatus in accordance with claim 1 including means for resetting the unit timer at a station after the accumulated times registered thereby have been supplied by the scanner to the recording means.

3. Apparatus in accordance with claim 2 including a scanner at each station, and means for registering the information at each data input station and at each unit timer in digits, the scanner at each station sequentially selecting said digits for recording.

4. Apparatus in accordance with claim 3 including means at each station for producing a signal indicating that no information thereat should be recorded, and means in said controller responsive to said signal for omitting actuation of the corresponding scanner.

5. Apparatus in accordance with claim 1 including error detection means associated with said scanner for detecting a malfunction in the operation of said system.

6. Apparatus in accordance with claim 5 including alarm means actuated by said error detection means for indicating said malfunction in the operation of said system, and alarm resetting means.

7. Apparatus in accordance with claim 1 including a scanner at each station, and manual means at a given station for controlling said controller to actuate the scanner at said given station and read out information at said given station to the recorder.

8. Apparatus in accordance with claim 7 including means for preventing control of the controller by said manual means when the controller is in an automatic cycle of operation.

9. Apparatus in accordance with claim 8 including a timing pulse source for intermittently actuating said controller, and means responsive to a timing pulse occurring during a manually-controlled cycle of operation to initiate an automatic cycle of operation after the manually-controlled cycle is completed.

10. Apparatus in accordance with claim 3 in which said data input station includes a matrix having a plurality of digit leads for supplying digit information to said recording means, a plurality of read-out leads variably connectable to the digit leads by a punched card reader, a plurality of read-out leads switchably connectable to the digit leads, a plurality of read-out leads for connection to unit timers at the respective station, said last mentioned read-out leads being switchably connectable to the digit leads by means of stepping switches in said unit timers, said read-out leads being connected to the scanner at the respective station for sequential actuation thereby, normally open switches in each of said digit and read-out leads, and relay means responsive to said read-out signal from said controller for simultaneously closing said switches.

11. Apparatus in accordance with claim 7 in which said manual means controls said controller to first supply time registered by the clock to the recorder and thereafter actuate the scanner at said given station.

12. Apparatus in accordance with claim 10 including an indicator lamp, and a switch actuated by said relay means for energizing said lamp.

13. Apparatus in accordance with claim 8 including means at a station for indicating when reading-out of information by the scanner at that station is taking place.

14. A data collection system for monitoring the operation of a plurality of data processing units at a plurality of stations which comprises
    monitoring apparatus associated with said stations including a data input station having means for registering information to be recorded, and a unit timer for each unit to be monitored having means for registering the accumulated operation time thereof;
    a scanner for selecting sequentially the information registered in the data input stations and the operating times registered by the unit timers,
    recording means for recording the information sequentially selected by said scanner,
    clock means for registering time,
    and a periodically-actuated controller for cyclically supplying time registered by said clock to said recording means and actuating said scanner to record the information sequentially selected thereby.

15. Apparatus in accordance with claim 14 including error detection means associated with said scanner for detecting failure of said scanner to read an item of information, and alarm means actuatable by said error detection means.

16. A system for monitoring the operation of a plurality of data processing units at a plurality of stations which comprises:
    monitoring apparatus associated with said stations including a data input station having means for registering information to be recorded, and a unit timer for each unit to be monitored having means for registering the accumulated operation time thereof;

a scanner for selecting sequentially the information registered in the data input stations and the operating times registered by the unit timers, recording means for recording the information sequentially selected by said scanner, clock means for registering time, and a periodically-actuated controller for automatically supplying time registered by said clock to said recording means and actuating said scanner to record the information sequentially selected thereby.

17. A system for monitoring the operation of a plurality of data processing units at a plurality of stations which comprises monitoring apparatus associated with each of said stations including a data input station having means for registering information to be recorded, a unit timer for each unit to be monitored having means for registering the accumulated operation time thereof, and a scanner for selecting sequentially the information registered in the data input station and the operating times registered by the unit timers;

recording means for recording the information sequentially selected by said scanner, clock means for registering time, and a periodically-actuated controller for cyclically supplying time registered by said clock to said recording means and actuating the scanners at said plurality of stations in sequence to record the information sequentially selected thereby.

18. A data collection system for collecting data from a plurality of stations which comprises a data input device at each station having means for registering information to be recorded, a scanner for selecting sequentially the information registered in the data input stations, recording means for recording the information sequentially selected by said scanner, clock means for registering time, and a periodically-actuated controller for cyclically supplying time registered by said clock to said recording means and for sequentially actuating said scanner, whereby said information selected by said scanner is recorded on said recording means.

References Cited

UNITED STATES PATENTS

| | | | |
|---|---|---|---|
| 2,849,704 | 8/1958 | Neff | 340—172.5 |
| 2,987,704 | 6/1961 | Gimpel et al. | 140—172.5 |
| 3,018,959 | 1/1962 | Thomas | 340—172.5 X |
| 3,029,414 | 4/1962 | Schrimpf | 340—172.5 |
| 3,102,256 | 8/1963 | Paul | 340—172.5 |
| 3,114,900 | 12/1963 | Anderson | 340—172.5 X |
| 3,118,722 | 1/1964 | Pullis et al. | 340—172.5 X |
| 3,221,309 | 11/1964 | Benghiat | 340—172.5 X |

ROBERT C. BAILEY, *Primary Examiner.*

PAUL J. HENON, *Examiner.*